United States Patent [19]
Na

[11] 3,886,574
[45] May 27, 1975

[54] CAMERA AND CARTRIDGE

[76] Inventor: Jung Hwan Na, 151-22, Hwa Yang Dong, Sung Dong Ku, Seoul, South Korea

[22] Filed: Aug. 16, 1973

[21] Appl. No.: 389,884

[30] Foreign Application Priority Data
May 21, 1973   South Korea .................... 883/73

[52] U.S. Cl. ............................................. 354/284
[51] Int. Cl. ................................. G03b 17/26
[58] Field of Search ........... 95/66, 72; 354/282, 284

[56] References Cited
UNITED STATES PATENTS

| | | | |
|---|---|---|---|
| 660,394 | 10/1900 | Reardon | 95/66 |
| 915,988 | 3/1909 | Moore | 95/72 |
| 2,269,183 | 1/1942 | Crumrine | 95/66 |
| 2,462,713 | 2/1949 | Bilofsky | 95/66 |
| 2,538,666 | 1/1951 | Buckham | 95/72 |
| 3,136,207 | 6/1964 | Flad | 95/11 |

*Primary Examiner*—John M. Horan
*Attorney, Agent, or Firm*—Cushman, Darby & Cushman

[57] ABSTRACT

A new camera and cartridge with a base plate, a U-shaped clips attached at one end to the plate for holding a film piece against the plate, a piece of velvet material fixed to the plate opposite each of the U-shaped end of the clips, a magnetized L-shaped frame fixed at one end to the base plate and defining an exposure window, a shieldplate slidably mounted between the clip and frame with a handle at one end and a stop at the other engaging a stop on each clip for limiting withdrawal of the shield.

3 Claims, 8 Drawing Figures

CAMERA AND CARTRIDGE

EXPLANATION OF INVENTION

This invention relates to a new camera and film cartridge of the type having separated individual film for a single shooting or for two shootings instead of the use of a long roll film.

In an ordinary camera, it is quite usual that a long roll film is used to the camera and, when the long film has been exposed, the roll film is sent to a workshop for development. When the user wants to quickly take only a cuts or a few cut, he must wait until such a long film has been fully exposed or must throw away regrettably the remained film in order to rapidly develop the film needed.

Moreover, when the user intends to take a photograph with a specific film such as black-white film; a color positive film; or a color negative film, etc., it is impossible to change at will the film installed because the long film is difficult to replace with another film until the installed film has been fully exposed. Further, when it takes a long time from the installation of a long film to the finish of all shootings, the film taken early can be changed in quality during storage in the camera.

While a dry-plate camera can be used in taking photographs with separated individual pieces of film, the handling of such a camera is more difficult than cameras which use a long roll film. Although a camera such as a polaroid can be utilized to take a photograph with separated individual pieces of film without removing the remained film from the camera, such camera has the inconvenience that a film can produce a single print only and is expensive.

The present invention relates to a camera and cartridge which is simple in construction and utilizes conventional film for taking a shot or two in a conventional camera. Accordingly, by the use of this cartridge which holds an individual film whose size is the 35mm. or some 55–8mm. along one side of it for a single shooting or both sides for two shootings, the defects shown by the ordinary camera comprising absolutely a long roll film can be solved and, by the establishment of a position that carries the cartridge onto the inside of an ordinary camera, the camera can use selectively the both of an ordinary roll film and a cartridge of this invention because the establishment of the position for the cartridge onto the inside of an ordinary camera does not give any obstacles in the reciprocal uses of such films. Further, a new camera equipped only with the cartridge of this invention can be also produced.

Further explanation is illustrated in detail by the accompanying drawings as follows:

FIG. 6 is a rear view of a camera opened the rear plate of the camera in order to show the state that the cartridge of this invention can be installed on;

FIG. 7 is a side view of a camera showing the perspective view of the state that the cartridge of this invention has been installed on.

Figure 1:
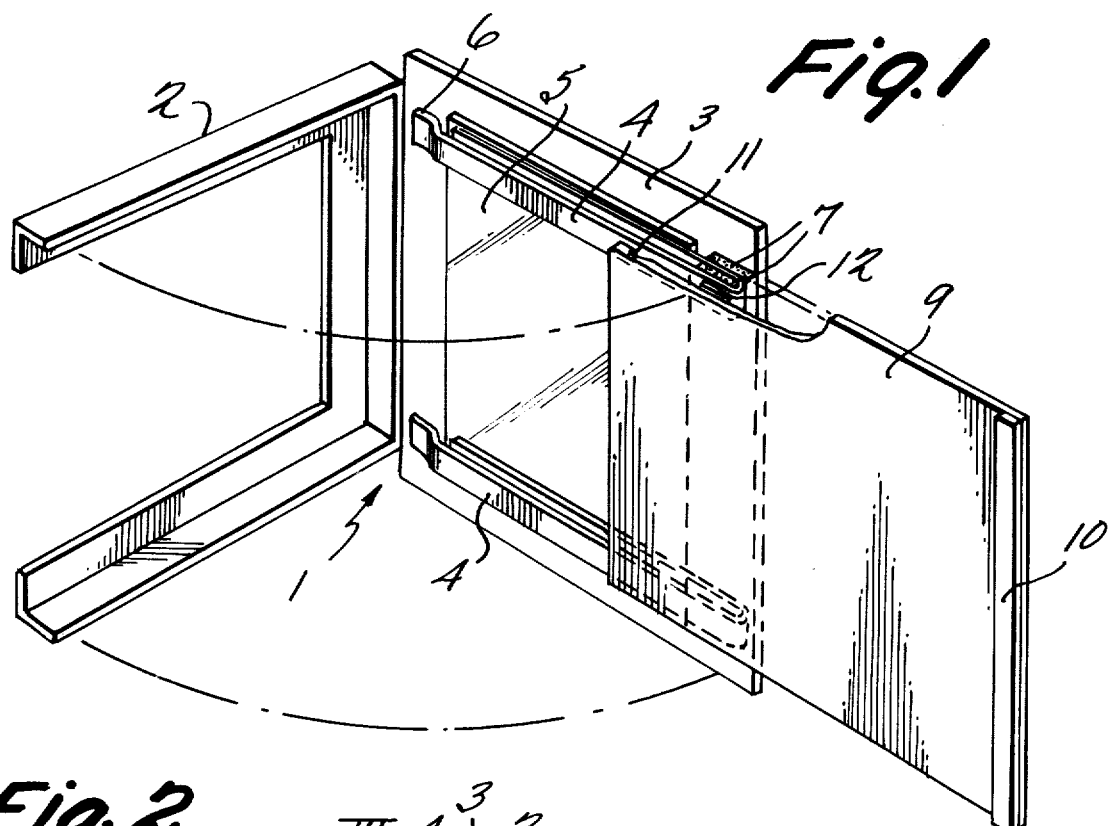
FIG. 1 is a detailed view of the cartridge of this invention.
Figure 2:
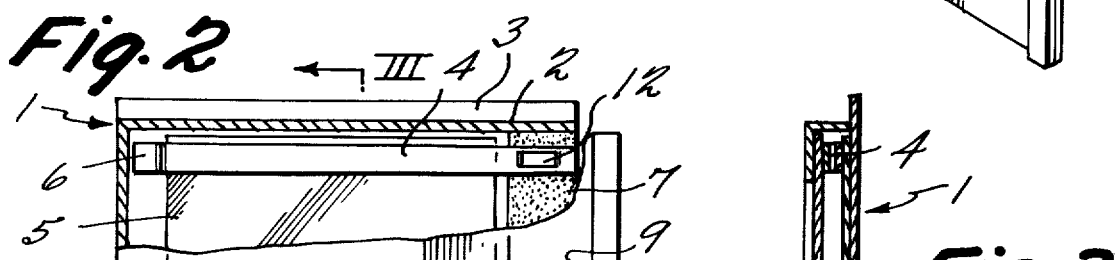
FIG. 2 is a plane view of the cartridge cut partially it in order to display perspectively its construction.
Figure 3:
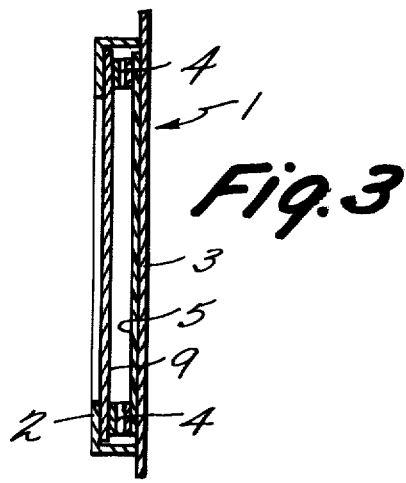
FIG. 3 is a cross section view of the cartridge cut along the line III — III of FIG. 2.
Figure 4:
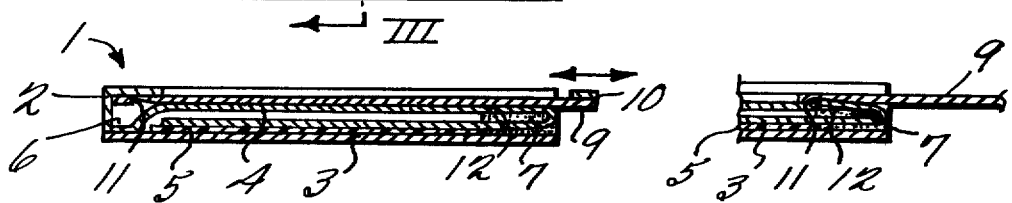
FIG. 4 is a cross section view of the cartridge cut along the line IV — IV of FIG. 2.
Figure 5:
FIG. 5 is a diagrammatic view of the construction of the cartridge taken partially along the view of FIG. 4.

As shown in the FIGS. 1 to 5, according to this invention, the cartridge 1 includes an L-shaped angle frame, made of a magnetic substance such as an iron plate which forms, a cover frame 2 whose central surface and a side wall are opened entirely to define an exposure window cover frame 2 is mounted on the base plate 3 together with a pair of the pressure members or dips 4 above and below base plate 3; the film 5 is supported by the pressure member 4 which are formed U-shaped and whose one end 6 is fixed on the base plate 3 and the other side is supported by the velvet material 7 that is fixed on the base plate 3; the shield plate 9 having handle 10 and stop 11 is located inside of the cartridge 1 and the falling off of the shield plate 9 is checked by the linkage of the stop 11 to the hook 12 placed on the outer circle of the U-shaped pressure member 4. The size of the cover frame 2 is smaller than that of the base plate 3.

When the shield plate 9 is in place light cannot enter into the film 5 because the film is always shaded by a shield plate 9 that is located between the base plate 3 and the cover frame 2. When the user takes a photograph, he must open the shield plate 9.

Figure 6:
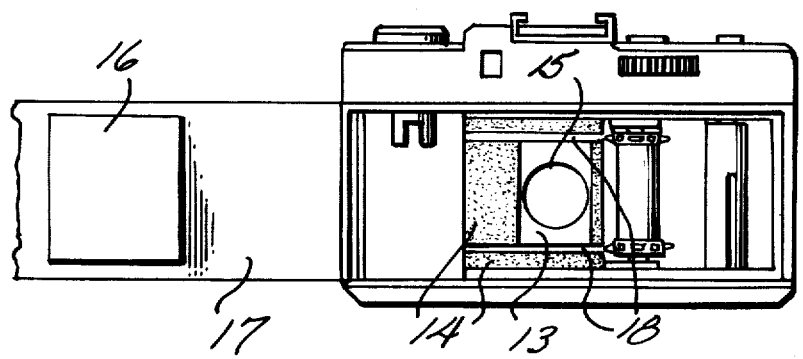
Figure 7:
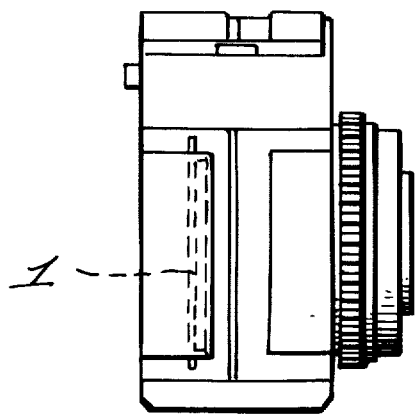

On the other hand, as referred to the FIGS. 6 and 7, the cartridge of this invention is installed on the reflection catching area so that the film in the cartridge is sensitive to light of an image that passes through the lens.

For properly locating cartridge 1 on the reflection catching area 13, a rubber magnet 14 is adhered on the circumference of the quardrangle 14 of the reflection catching area 13. The rear pressure plate 16 placed on the rear plate 17 of a camera will also elastically push the cartridge 1 installed on the reflection catching area 13 during shooting.

When an ordinary long roll film is used to an ordinary camera, it can be used with an ordinary operation. However, when a cartridge of this invention is used, in order to take one or two cuts of the photograph, the user has to install the cartridge of this invention on the reflection catching area along the guide line 18 of film in a camera that comprises the magnetic area 14. After the installation of the cartridge 1, the shield plate 9 is opened through the handle 10 until the opening of the shield plate 9 is checked by the hook 12. Then, the film will be located to be sensitive to light passing through the lens 15. After the shooting, the cartridge 1 can be withdrawn from the rubber magnet 14.

Figure 8:
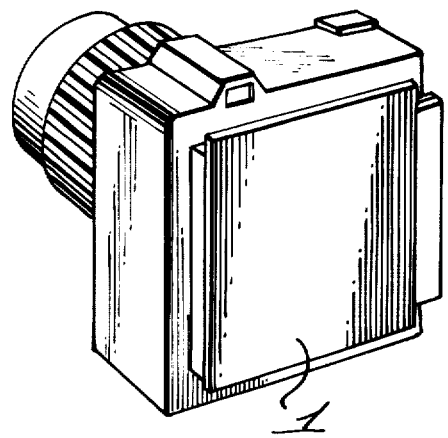
FIG. 8 is a perspective view of an example of a new type of a camera comprising the cartridge of this invention.

In the embodiment of this invention, it is possible to produce a new type of a camera, as referred to the FIG. 8, that comprises only the cartridge of this invention. In such case, the camera can be constructed to be small in size.

According to this invention, the cartridge can comprise two sheets of film along both sides. Thus the cartridge will have two rear sides of two cartridges adhered each other.

As mentioned above, according to this invention, the user can take one or a few cuts of the photograph at will by the use of the cartridge of this invention without wasting a long roll of film. The cartridge of this invention can be composed of all kinds of film and the size of cartridge can be adjusted to all kinds of camera.

In order to use the cartridge of this invention, a new type of camera adaptable only for this cartridge can be also produced. Alternately by the attachment of a magnet of the quadrangle of the reflection catching area in a camera, an ordinary camera can conveniently and economically use not only a long roll film, but also the cartridge of this invention.

I claim:

1. A film cartridge comprising:

a base plate, a least one U-shaped clip member attached at one end to said plate and urging a film piece against said plate, at least one piece of soft material fixed to said plate opposite the U-shaped end of said clip member, a magnetic frame member of L-shaped cross section side fixed at the end to one side of said base plate and a long side extending parallel to said base plate, said frame member defining an exposure window, a shieldplate disposed for sliding movement between said frame member and said clip member and having at one end a handle portion for manually exerting a force to effect said sliding movement and at the other end a stop portion and at least one stop member on said clip member adjacent said U-shaped end for engaging said stop portion and preventing complete withdrawal of said plate.

2. A cartridge as in claim 1 including two clip members, two velvet pieces, two stop portions and two stop members.

3. A camera comprising:

a film cartridge comprising a base plate, at least one U-shaped clip member attached at one end to said plate and urging a film piece against said plate, at least one piece of velvet material fixed to said plate opposite the U-shaped end of said clip member, a magnetic frame member of L-shape cross section having a short side fixed at the end to one side of said base plate and a long side extending parallel to said base plate, said frame member defining an exposure window, a shield plate disposed for sliding movement between said frame member and said clip member and having at one end a handle portion for manually exerting a force to effect said sliding movement and at the other end a stop portion and at least one stop member on said clip member adjacent said U-shaped end for engaging said stop portion and preventing complete withdrawal of said plate, a lens, and a frame means mounting said lens and having a magnetic portion for holding said magnetic frame member and accordingly said cartridge.

* * * * *